US012222998B2

(12) United States Patent
Pham et al.

(10) Patent No.: US 12,222,998 B2
(45) Date of Patent: Feb. 11, 2025

(54) METHODS AND SYSTEMS FOR DETERMINING A QUERY RESPONSE USING A COMPUTING PLATFORM IN A DOMAIN OF BEAUTY OR COSMETIC INDUSTRY

(71) Applicant: Ulta Salon, Cosmetics & Fragrance, Inc., Bolingbrook, IL (US)

(72) Inventors: Ben Pham, Bolingbrook, IL (US); Chatura Samarasinghe, Bolingbrook, IL (US); David Ruvalcaba, Bolingbrook, IL (US)

(73) Assignee: Ulta Salon, Cosmetics & Fragrance, Inc., Bolingbrook, IL (US)

( * ) Notice: Subject to any disclaimer, the term of this patent is extended or adjusted under 35 U.S.C. 154(b) by 171 days.

(21) Appl. No.: 17/986,299

(22) Filed: Nov. 14, 2022

(65) Prior Publication Data
US 2024/0160675 A1    May 16, 2024

(51) Int. Cl.
*G06F 16/9532* (2019.01)
*G06F 16/9535* (2019.01)
*G06F 16/9538* (2019.01)

(52) U.S. Cl.
CPC ...... *G06F 16/9532* (2019.01); *G06F 16/9535* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 10,373,177 B2 | 8/2019 | Vijayaraghavan et al. | |
| 10,664,540 B2 | 5/2020 | Daianu et al. | |
| 10,818,288 B2 | 10/2020 | Garcia et al. | |
| 11,016,997 B1* | 5/2021 | Huang | G06F 16/285 |
| 11,182,565 B2 | 11/2021 | Ray et al. | |
| 2018/0082197 A1* | 3/2018 | Aravamudan | G16B 50/10 |
| 2021/0295822 A1* | 9/2021 | Tomkins | G06F 16/3323 |
| 2022/0058433 A1* | 2/2022 | Han | G06F 18/22 |
| 2024/0126795 A1* | 4/2024 | Zhong | H04L 51/02 |

OTHER PUBLICATIONS

Anghel, Andreea, et al., "Benchmarking and Optimization of Gradient Boosting Decision Tree Algorithms", Workshop on Systems for ML and Open Source Software at NeurIPS 2018, Montreal, Canada, 7 pages. (Year: 2018).*

* cited by examiner

*Primary Examiner* — Scott A. Waldron
(74) *Attorney, Agent, or Firm* — McDonnell Boehnen Hulbert & Berghoff LLP (57) ABSTRACT

An example method includes receiving by a server and from a computing device a natural language-based query, converting the natural language-based query into an embedding formatted query having a vector format, inputting the embedding formatted query into a machine-learning logic model, and determining by the machine-learning logic model a query response to the embedding formatted query that is predicted by the machine-learning logic model to be in context of beauty or cosmetic industry. The machine-learning logic model is trained using a multi-dimensional learned-embedding that includes semantically similar terms in proximity in an embedding space and the embedding space is limited to salient terms associated with the beauty or cosmetic industry. The method also includes communicating by the machine-learning logic model the query response to the computing device.

16 Claims, 7 Drawing Sheets

METHODS AND SYSTEMS FOR DETERMINING A QUERY RESPONSE USING A COMPUTING PLATFORM IN A DOMAIN OF BEAUTY OR COSMETIC INDUSTRY

FIELD

The present disclosure relates generally to methods and systems for determining a query response using a computing platform in a domain of beauty or cosmetic industry. More particularly, the disclosure relates to determining, by a machine-learning logic model, a query response to an embedding formatted query that is predicted by the machine-learning logic model to be in context of beauty or cosmetic industry and the machine-learning logic model is trained using a multi-dimensional learned-embedding that includes semantically similar terms in proximity in an embedding space and the embedding space is limited to salient terms associated with the beauty or cosmetic industry.

BACKGROUND

A chatbot is a software application used to conduct an on-line chat conversion in lieu of providing direct contact with a live human agent. Chatbot software can help customers by automating conversations and interacting with customers through messaging platforms. Chatbot systems typically require continuous tuning and testing. The beauty industry has undergone a digital makeover with the move towards creating virtual beauty assistants in a form of chatbots. An idea is that chatbots can perform many of the functions of in-store human assistants.

In addition, website search functionality works similarly to chatbots, in that the search functionality attempts to handle user queries and determines a user intent.

Furthermore, general natural language processing operates similarly as well with the underlying goal of determining an intent, action item, or follow-on request processing to perform in response to a natural language input.

Initial attempts at search, chatbot, and other natural language input query technology in the beauty industry have been directed to handle customer service enquiries, such as store locations and product returns. What is needed is a more advanced system for the beauty industry to handle more beauty specific and complex issues and questions expected to be received from customers.

SUMMARY

Within an example, a method of providing a computing platform in a domain of beauty or cosmetic industry is described. The method comprises receiving, by a server and from a computing device, a natural language-based query and converting the natural language-based query into an embedding formatted query having a vector format. The method also comprises inputting the embedding formatted query into a machine-learning logic model and determining, by the machine-learning logic model, a query response to the embedding formatted query that is predicted by the machine-learning logic model to be in context of beauty or cosmetic industry. The machine-learning logic model is trained using a multi-dimensional learned-embedding that includes semantically similar terms in proximity in an embedding space, and the embedding space is limited to salient terms associated with the beauty or cosmetic industry. The method also includes communicating, by the machine-learning logic model, the query response to the computing device.

In another example, a system is described comprising one or more processors and non-transitory computer-readable media having stored therein instructions, which when executed by the one or more processors, causes the system to perform functions. The functions comprise receiving, from a computing device, a natural language-based query and converting the natural language-based query into an embedding formatted query having a vector format. The functions also include inputting the embedding formatted query into a machine-learning logic model, and determining, by the machine-learning logic model, a query response to the embedding formatted query that is predicted by the machine-learning logic model to be in context of beauty or cosmetic industry. The machine-learning logic model is trained using a multi-dimensional learned-embedding that includes semantically similar terms in proximity in an embedding space, and the embedding space is limited to salient terms associated with the beauty or cosmetic industry. The functions also include communicating, by the machine-learning logic model, the query response to the computing device.

In another example, a non-transitory computer-readable media is described having stored therein executable instructions, which when executed by a system one or more processors causes the system to perform functions. The functions comprise receiving, from a computing device, a natural language-based query; converting the natural language-based query into an embedding formatted query having a vector format, and inputting the embedding formatted query into a machine-learning logic model. The functions also include determining, by the machine-learning logic model, a query response to the embedding formatted query that is predicted by the machine-learning logic model to be in context of beauty or cosmetic industry, and the machine-learning logic model is trained using a multi-dimensional learned-embedding that includes semantically similar terms in proximity in an embedding space. The embedding space is limited to salient terms associated with the beauty or cosmetic industry. The functions also include communicating, by the machine-learning logic model, the query response to the computing device.

The features, functions, and advantages that have been discussed can be achieved independently in various examples or may be combined in yet other examples. Further details of the examples can be seen with reference to the following description and drawings.

BRIEF DESCRIPTION OF THE FIGURES

Examples, objectives and descriptions of the present disclosure will be readily understood by reference to the following detailed description of illustrative examples when read in conjunction with the accompanying drawings, where the following drawings illustrate examples as described below.

DETAILED DESCRIPTION

Disclosed examples will now be described more fully hereinafter with reference to the accompanying drawings. Several different examples are described and should not be construed as limited to all possible alternatives. Rather, these examples are described so that this disclosure is thorough and complete and fully conveys a scope of the disclosure to those skilled in the art.

Within examples, a novel methodology of representing natural language-based queries is utilized in a multitude of machine learning applications. For example, a natural language-based query is processed in a context of beauty or cosmetic industry for specifically tailored responses. An input module receives a freeform natural language-based query, and using machine-learning logic models, accurately computes a query response to minimize human intervention. The models include a dual prediction algorithm producing two different predictions followed by a decision-making process to combine the two different predictions into a best possible understanding of the query. A first prediction uses a customized model for beauty language for the cosmetic industry, and a second prediction uses a generic contextually-based determination model. Based on the beauty language and generic predictions, a best possible "intent" is determined. The dual predictions cover both generic intents (e.g., product delivery issues) as well as cosmetic specific intents (e.g., searching for product with a color "passion" and utilize visual descriptiveness of products). Once an intent is determined for the query, automated action(s) are taken accordingly.

Within the beauty or cosmetic industry, vocabulary can have different contextual meanings. For example, the word "passion" should be interpreted as a shade of red instead of a definition of meaning "strong emotion". Thus, the first prediction model is trained specifically for beauty language, but the second prediction model is trained more generically to take into account a possibility for ordinary and customary meaning of natural language-based queries (e.g., such as queries about lost customer loyalty numbers).

Implementations of this disclosure provide technological improvements that are particular to computer technology, for example, those concerning natural language-based query processing. Computer-specific technological problems, such as specialized training of machine-learning logic models, can be wholly or partially solved by implementations of this disclosure. For example, implementation of this disclosure allows for a natural language-based query to be processed simultaneously by two differently trained machine-learning logic models so that beauty or cosmetic industry specific queries are considered in addition to overall generic queries.

Implementations of this disclosure thus introduce new and efficient improvements in the ways in which natural language-based queries are processed by a server to increase a probability of computing a most likely query response.

Figure 1:
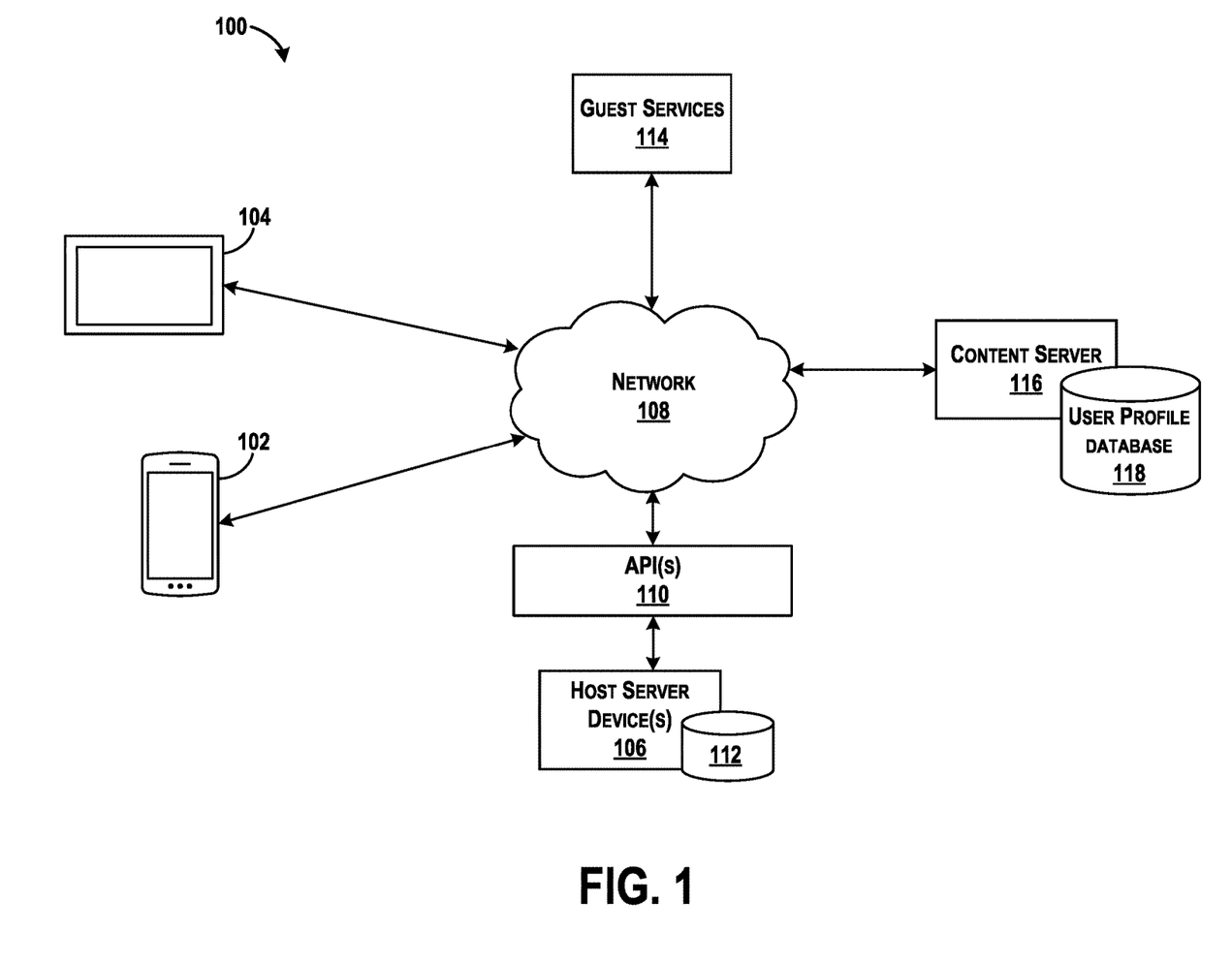
FIG. 1 is a block diagram illustrating an example of a networked computer system, according to an example implementation.

Referring now to the figures, FIG. 1 is a block diagram illustrating an example of a networked computer system 100, according to an example implementation. The networked computer system 100 includes one or more client devices 102 and 104 coupled to one or more host server device(s) 106 via a network 108. The network 108 represents one or more local area networks (LANs), wide area networks (WANs), cellular networks, and/or other networks using any of wired, wireless, terrestrial microwave, or satellite links, and may include the public Internet.

The client devices 102 and 104 can be a special purpose data processor, a general-purpose computer, smartphone, tablet, a computer system, or a group of networked computers or computer systems configured to perform steps or modes of methods described herein. Further examples of the client devices 102 and 104 may include, without limitation, handheld computers, wearable devices, laptop computers, desktop computers, servers, portable media players, gaming devices, in-store kiosks, and so forth. According to one example, the client devices 102 and 104 are built on a personal computer platform, such as the Apple® or Android® platform. Although FIG. 1 illustrates two of the client devices 102 and 104, the networked computer system may include fewer or more of the client devices 102 and 104 operating at any time. The client devices 102 and 104 represent computing devices (and the terms client device and computing device are used interchangeably throughout), which can be portable in nature as described above.

The host server devices(s) 106 may include any number of computers, virtual machine instances, and/or data centers that are configured to host or execute one or more instances of host applications. The host server devices(s) 106 may be involved, directly or indirectly, in processing requests received from the client devices 102 and 104. The host server devices(s) 106 may comprise, for example, one or more of a network device, a web server, an application server, a database server, etc. A collection of the host server devices(s) 106 may be configured to implement a network-based service. For example, a provider of a network-based service may configure one or more of the host server devices(s) 106 and host applications (e.g., one or more web servers, application servers, database servers, etc.) to collectively implement a network-based application.

The client devices 102 and 104 communicate with one or more host applications at the host server devices(s) 106 to exchange information. The communication between the client devices 102 and 104 and a host application may, for example, be based on the Hypertext Transfer Protocol (HTTP) or any other network protocol. Content delivered from the host application to the client devices 102 and 104 may include, for example, HyperText Markup Language (HTML) documents, media content, etc. The communication between the client devices 102 and 104 and a host application may include sending various requests and receiving data packets. For example, the client devices 102 and 104 or an application running on the client devices 102 and 104 may initiate communication with a host application by making a request for a specific resource (e.g., based on an HTTP request), and the host server devices(s) 106 may respond with the requested content stored in one or more response packets.

Thus, one or more client applications may be executed at the client devices 102 and 104. Some applications executing at the client devices 102 and 104 may implement one or more application programming interfaces (APIs) 110. The APIs 110, for example, process inputs and control outputs of the client devices 102 and 104. For example, a client application executing at the client devices 102 and 104 accesses the host server device(s) 106 via the API 110 to retrieve configuration parameters for a particular requested skin advisor platform. The client application then uses local image processing libraries along with retrieved configuration parameters to generate visual media in response to a request by the host server device(s) 106.

The APIs 110 serve as an interface between the client devices 102 and 104 and the host server device(s) 106. One or more repositories and/or databases 112, which support certain utilities, may store content required for implementing the skin advisor platform described herein, and is accessible by the host server device(s) 106. For example, the databases 112 store host applications, content (e.g., images/video), data related to image processing (e.g., image processing libraries, computer graphics, predefined visual effects, etc.), information relevant to the users (e.g., registration information or usage statistics), metadata, and any other data used in implementing the techniques described herein.

Thus, in some examples, techniques described herein are provided by a software platform that is made accessible via a website or an application via the API 110. Alternatively, or in addition, techniques described herein are offered as a platform product directly implementable on various devices or systems.

The networked computer system 100 also includes a guest services server 114. The guest services server 114 performs communicates with the client devices 102 and 104 to enable users of the client devices 102 and 104 to communicate with guest services specialists to resolve queries through human interaction.

The networked computer system 100 also includes a content server 116. The content server 116 is in communication with the client devices 102 and 104 and the host server device(s) 106 via the network 108 to provide data, such as training data, useful for training machine-learning logic models to process queries received from the client devices 102 and 104. The content server 116 is shown to further include or be in communication with a user profile database 118 for accessing data or information for user accounts, for example.

Figure 2:
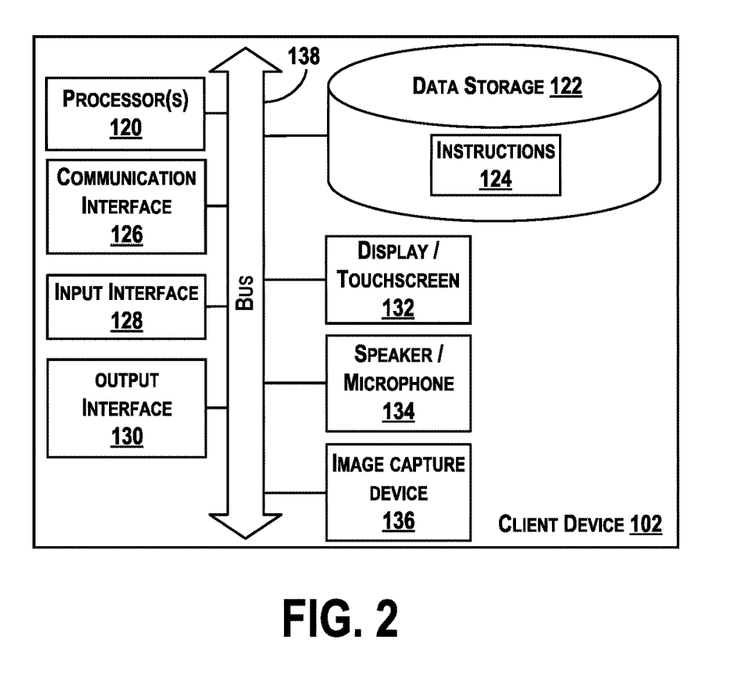
FIG. 2 illustrates a simplified block diagram of the client device, according to an example implementation.

FIG. 2 illustrates a simplified block diagram of the client device 102, according to an example implementation. FIG. 2 does not necessarily show all of the hardware and software modules included in the client device 102, and omits physical and logical connections that will be apparent to one of ordinary skill in the art after review of the present disclosure. Although FIG. 2 illustrates components for the client device 102, the features shown in FIG. 2 are illustrative as components of any client device for use in the networked computer system 100.

The client device 102 includes one or more processor(s) 120, and a non-transitory computer-readable media (data storage) 122 storing instructions 124, which when executed by the one or more processor(s) 120, causes the client device 102 to perform functions (as described herein). To perform functions, the client device 102 includes a communication interface 126, an input interface 128, an output interface 130, a display/touchscreen 132, a speaker/microphone 134, and an image capture device 136, and each component of the client device 102 is connected to a communication bus 138. The client device 102 may also include hardware to enable communication within the client device 102 and between the client device 102 and other devices (not shown). The hardware may include transmitters, receivers, and antennas, for example.

The communication interface 126 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 126 is configured to receive input data from one or more devices, and configured to send output data to other devices.

The data storage 122 includes or takes the form of memory, such as one or more computer-readable storage media that can be read or accessed by the one or more processor(s) 120. The computer-readable storage media can include volatile and/or non-volatile storage components, such as optical, magnetic, organic or other memory or disc storage, which can be integrated in whole or in part with the one or more processor(s) 120. The non-transitory data storage 122 is considered non-transitory computer readable media. In some examples, the non-transitory data storage 122 can be implemented using a single physical device (e.g., one optical, magnetic, organic or other memory or disc storage unit), while in other examples, the non-transitory data storage 122 can be implemented using two or more physical devices. The non-transitory data storage 122 thus is a computer readable medium, and instructions 124 are stored thereon. The instructions 124 include computer executable code. The data storage 122 further stores information executable by the processor(s) 120 to perform functions for submitting natural language-based queries to the host server device(s) 106, for example.

The one or more processor(s) 120 is a general-purpose processor or special purpose processor (e.g., digital signal processors, application specific integrated circuits, etc.). The one or more processor(s) 120 receives inputs from the communication interface 126 as well as from other components (the display/touchscreen 132, the speaker/microphone 134, or the image capture device 136), and processes the inputs to generate outputs that are stored in the non-transitory data storage 122. The one or more processor(s) 120 can be configured to execute the instructions 124 (e.g., computer-readable program instructions) that are stored in the non-transitory data storage 122 and are executable to provide the functionality of the client device 102 described herein.

The input interface 128 is used to enter data or commands and can include, for example, a keyboard, a scanner, a user pointing device such as, for example, a mouse, a trackball, or a touch pad, or may further include the touchscreen or microphone.

The output interface 130 outputs information for reporting or storage, and thus, the output interface 130 may be similar to the communication interface 126 and can be a wireless interface (e.g., transmitter) or a wired interface as well.

Figure 3:
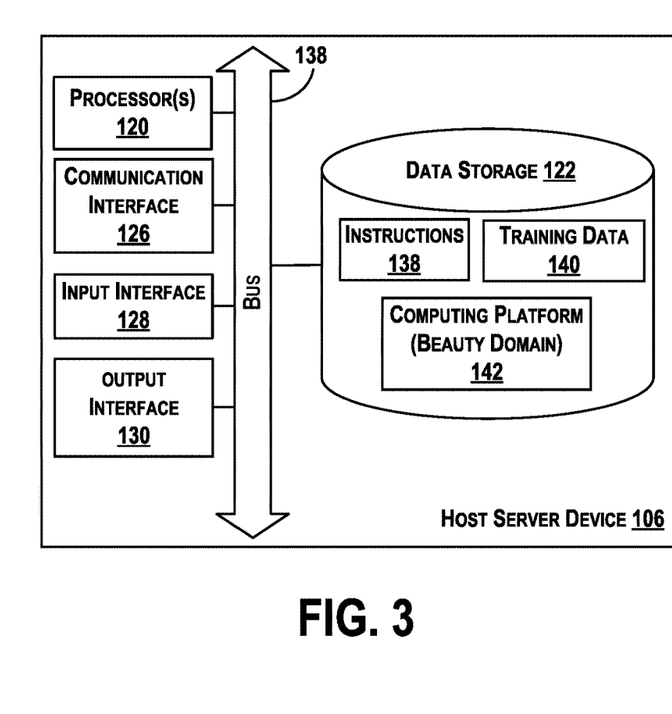
FIG. 3 illustrates a simplified block diagram of the host server device, according to an example implementation.

FIG. 3 illustrates a simplified block diagram of the host server device 106, according to an example implementation.

Like the illustration in FIG. 2, FIG. 3 does not necessarily show all of the hardware and software modules included in the host server device 106. Further, similar components illustrated in FIG. 3 that have been described with reference to FIG. 2 are not repeated here.

The host server device 106 can take the form of a server computer, a client computer, a personal computer (PC), a user device, a tablet, a laptop computer, a set-top box (STB), a personal digital assistant (PDA), a thin-client device, or any machine capable of executing a set of instructions (sequential or otherwise) that specify actions to be taken by that machine.

In addition to instructions 138 executable by the processor(s) 120, the host server device 106 also includes training data 140 stored in the data storage 122 and a computing platform (beauty domain) 142. Details of the training data 140 and the computing platform 142 are described below with reference to FIG. 4. Within one example, in operation, when the instructions 138 are executed by the one or more processor(s) 120 of the host server device 106, the one or more processor(s) 120 is caused to perform functions for providing the computing platform 142 in a domain of beauty or cosmetic industry, as described herein, and specifics examples are further described with reference to FIGS. 4-8.

Figure 4:
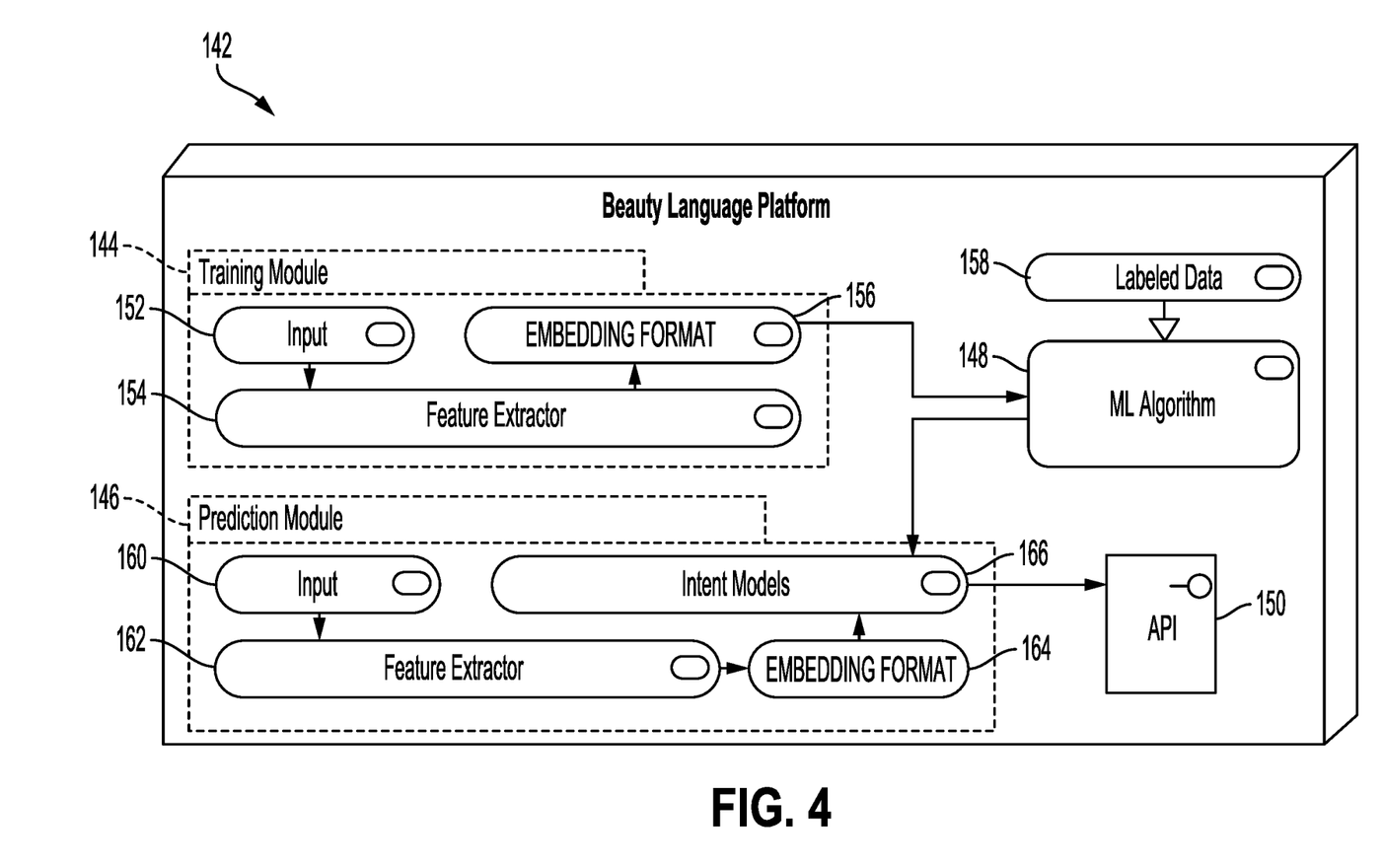
FIG. 4 illustrates a block diagram of a computing platform in a domain of beauty or cosmetic industry, according to an example implementation.

FIG. 4 illustrates a block diagram of a computing platform 142 in a domain of beauty or cosmetic industry, according to an example implementation. Within examples, some or all of the components of the networked computer system 100 perform some functions of the computing platform 142. Depending upon a particular implementation, the various components described with respect to FIG. 3 implemented at a single computing device (e.g., the host server device(s) 106) or distributed across several computing devices or servers perform functions of the computing platform 142. In some examples, certain functionalities of the computing platform 142 at the host server device 106 in one example, and in another example, functions of training machine-learning logic models are performed remotely at the content server 116.

With reference to FIG. 4, and throughout the disclosure, some components are described as "modules," "engines", "models", or "generators" and such components include or take a form of a general purpose or special purpose hardware (e.g., general or special purpose processors), firmware, and/or software embodied in a non-transitory computer-readable (storage) medium for execution by one or more processors to perform described functionality.

The computing platform 140 is operable to receive natural language-based queries, and to process the queries to determine an "intent". After determining the intent, the computing platform 140 is operable to take automated action(s) accordingly. The computing platform 140 operates using machine-learning logical models including of an ensemble of models such as transformer and boosted trees to process the queries.

The computing platform 142 includes a training module 144, a prediction module 146, machine-learning (ML) algorithm(s) 148, and an API 150.

The training module 144 is operable to train the machine-learning (ML) algorithm(s) 148 over time using newly received natural language-based queries at an input 152. The training module 144 includes a feature extractor 154 to convert a natural language-based query into an embedding-like form, such as known as ConveRT (Conversational Representations from Transformers). The embedding-like form is a pre-training framework for conversational tasks that leverages quantization and subword-level parameterization. The feature extractor 154 outputs the converted query in an embedding format 156 to the machine-learning (ML) algorithm(s) 148.

The machine-learning (ML) algorithm(s) 148 receive training data in a form of query-labeled data 158 for use in a pre-training function. The machine-learning (ML) algorithm(s) 148 follow a supervised learning technique to train in an on-going manner. Past customer care agent interaction data that has been labeled can be used as a data source for the query-labeled data 158. In this workflow, live customer care agents tag every customer care query that is received into a pre-defined category. The tagged data is then transformed into an embedding space and input into the machine-learning (ML) algorithm(s) 148.

The prediction module 146 is operable to receive a natural language-based query at an input 160 (as sent or input by a computing device, such as one of the client devices 102 and 104), and a feature extractor 162 converts the natural language-based query into an embedding-like form. The feature extractor 162 outputs the converted query in an embedding format 164 to intent models 166. The intent models 166 utilize the machine-learning (ML) algorithm(s) 148 to process the embedding format 164 of the natural language-based query in order to determine a corresponding intent in a form of a query response. To do so, the intent models 166 determine the query response that is predicted by the machine-learning logic model to be in context of beauty or cosmetic industry, and the machine-learning logic model is trained using a multi-dimensional learned-embedding that includes semantically similar terms in proximity in an embedding space that is limited to salient terms associated with the beauty or cosmetic industry. The corresponding query response is communicated via the API 150 to the computing device.

Figure 5:
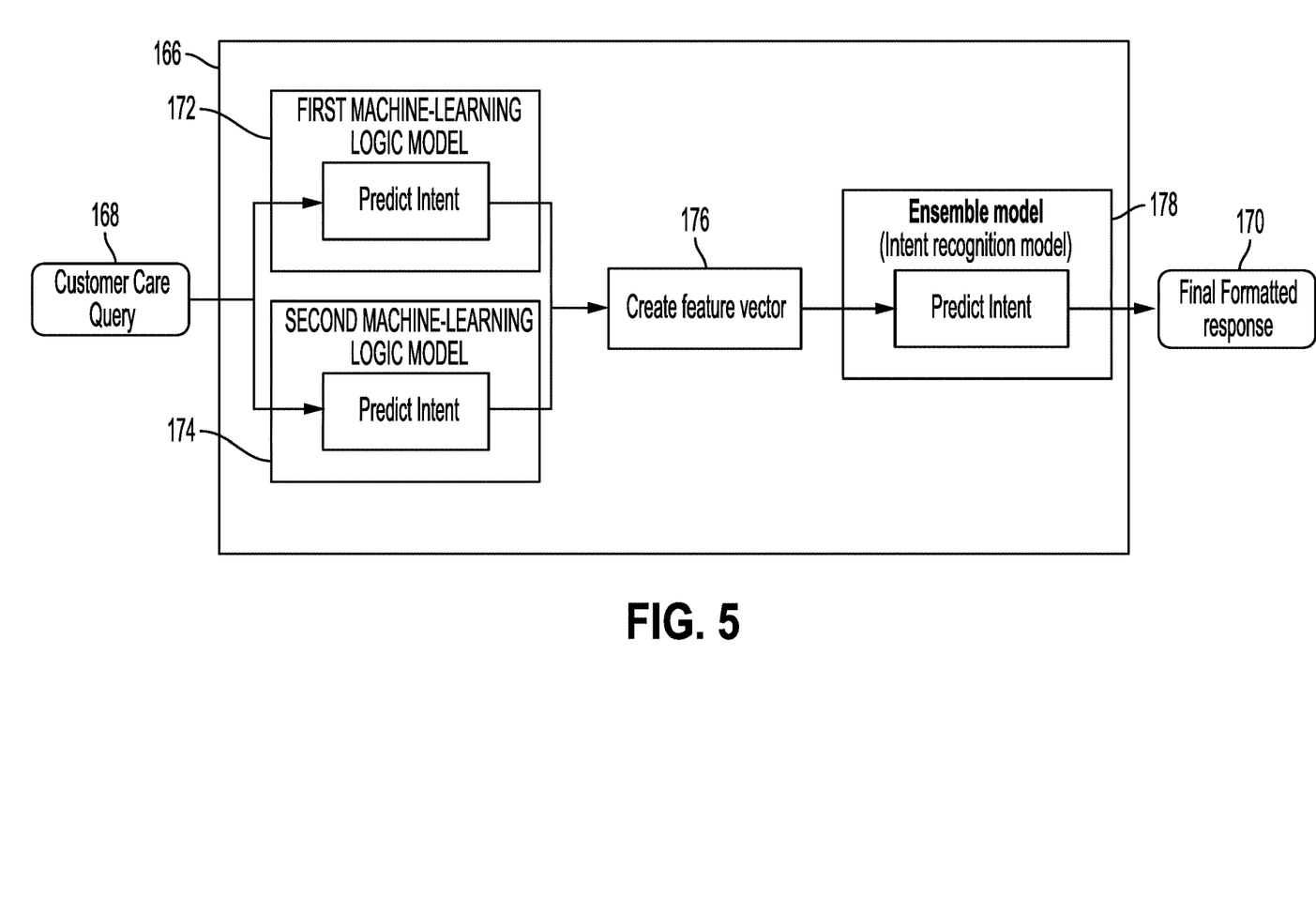
FIG. 5 illustrates a block diagram of the intent models, according to an example implementation.

FIG. 5 illustrates a block diagram of the intent models 166, according to an example implementation. As mentioned, the intent models 166 conceptually illustrate functionality of the prediction module 146 of the computing platform 142, and thus, the intent models 166 take the form of software or instructions stored on non-transitory computer readable medium and are executable by a processor to perform the described functionality.

The intent models 166 receive a customer care query 168 in an embedding format, and process the customer care query 168 to determine a query response 170. To do so, the intent models 166 include a first machine-learning logic model 172 to determine a first predicted intent to the embedding formatted query, and a second machine-learning logic model 174 to determine a second predicted intent to the embedding formatted query that is different than the first predicted intent. The first predicted intent and the second predicted intent are combined into a feature vector 176. The intent models 166 also include an ensemble model 178 that processes the feature vector to determine the query response 170.

The first machine-learning logic model 172 predicts an intent to be in context of beauty or cosmetic industry, and the first machine-learning logic model 172 is trained using a multi-dimensional learned-embedding that includes semantically similar terms in proximity in an embedding space that is limited to salient terms associated with the beauty or cosmetic industry. The beauty or cosmetic industry includes a variety of personal products (e.g., skin care, color cosmetics, hair care, and fragrances), beauty appliances (e.g., hair dryers, brushes, and combs), and services (e.g., salons and day spas). The beauty and cosmetic industry describes an industry that manufactures and/or distributes cosmetic products. As an example of terminology having a different meaning in a context of the beauty and cosmetic industry, for the customer care query 168 of "passion" and "sand", the first machine-learning logic model 172 may generate a first predicted intent of cosmetic products having red and yellow colors, where the terms "passion" and "sand" are associated with colors of makeup.

In addition, within examples, the first machine-learning logic model 172 outputs the first predicted intent in a form of a first predicted intent vector including first confidence scores for all possible intents for which the first machine-learning logic model has been trained. For illustration purposes, in an example where the first machine-learning logic model 172 is trained on four intents, and the third intent is determined to be a most likely response to the input query, the first predicted intent vector is in a form such as ([intent #3, 95%], [intent #1, 90%], [intent #2, 80%], [intent #4, 70%]). In this manner, the first machine-learning logic model 172 provides information for probabilities for each of the trained intents matching a likely intent of the query rather than a trained intent having a highest confidence score. Of course, the first machine-learning logic model 172 is trained on more than just four intents, and up to any number of intents as desired.

The first machine-learning logic model 172 determines an associated confidence score for each trained intent in a form of a percent or a number between 0 and 1 that represents a likelihood that the trained intent of the first machine-learning logic model is correct and will be responsive to the customer care query 168. The confidence score is based on an amount that the customer care query 168 matches to one of the trained intents. A higher the match, then the higher the confidence score and vice versa.

Within examples, as mentioned, the first machine-learning logic model 172 outputs a confidence score for every trained intent in a ranked manner for use by a subsequent decision tree.

The second machine-learning logic model 174 predicts an intent without limitations to the context of beauty or cosmetic industry, but rather, using a more broad and generic database. The second machine-learning logic model 174 is trained using data not limited to salient terms associated with the beauty or cosmetic industry. Thus, the second machine-learning logic model 174 is trained using a data set different from the data set used to train the first machine-learning logic model 172. As an example, for the customer care query 168 of "passion" and "sand", the second machine-learning logic model 174 may generate a second predicted intent more directly related to the dictionary definition of the query terms for "passion" and "sand". Thus, the second predicted intent is different than the first predicted intent since the first machine-learning logic model 172 and the second machine-learning logic model 174 are trained based on a different training data set.

In addition, within examples, like the first machine-learning logic model 172, the second machine-learning logic model 174 also outputs the second predicted intent in a second predicted intent vector including second confidence scores for all possible intents for which the second machine-learning logic model has been trained. For this purpose, the second machine-learning logic model 174 determines the confidence scores for possible intents in the same way as described with respect to the first machine-learning logic model 174.

Following, the intent models 166 combine the first predicted intent and the second predicted intent into the feature vector 176. The feature vector 176 takes the form of a listing of the predicted intents in a vector format. Within examples, the feature vector 176 includes a listing of all possible intents for which the first machine-learning logic model 172 and the second machine-learning logic model 174 have been trained with associated confidence scores ranking the possible intents as the query response. The feature vector 176 is then a string of intents for which each the first machine-learning logic model 172 and the second machine-learning logic model 174 have been trained and the confidence score that such intents are probable matching intents for the input query.

The feature vector 176 is input into the ensemble model 178 to for processing to determine the query response 170. The ensemble model 178 takes the form of gradient-boosted decision tree (GBDT) and uses a gradient-boosted decision tree machine learning library. The first machine-learning logic model 172 and the second machine-learning logic model 174 output different predicted intents for redundancy and variance of the prediction. The feature vector 176 is then a transformed query, and the ensemble model 178 processes the feature vector 176 to identify a paired training label.

The ensemble model 178 improves a single model (e.g., the first machine-learning logic model 172) by combining the single model with another model (e.g., the second machine-learning logic model 174) in order to generate a collectively strong model. Gradient boosting is a process of additively generating models as a gradient descent algorithm over an objective function. Gradient boosting sets targeted outcomes for the next model in an effort to minimize errors. Targeted outcomes for each case are based on the gradient of the error with respect to the prediction.

The ensemble model 178 includes an ensemble of trained decision trees, and each iteration in the trees uses error residuals of a previous model to fit the next model. A final prediction is a weighted sum of all of the tree predictions. Thus, the feature vector 176 is a transformed version of the customer care query 168, and is input to the ensemble model 178 for processing to identify the query response 170. The processing works to classify the feature vector 176 into a given trained/labeled intent. The ensemble model 178 receives the listing of predicted intents and associated confidence scores in the feature vector 176, and processes these as inputs to generate a query response in a beneficial or technical way. For example, rather than simply receiving a single output from each of the first machine-learning logic model 172 and another single output from the second machine-learning logic model 174, and then selecting the output with a highest confident prediction, the ensemble model 178 receives the feature vector 176 including a confidence score for every trained intent in a ranked manner output from the first machine-learning logic model 174 and second confidence scores for all possible intents for which the second machine-learning logic model has been trained. The ensemble model 178 is trained on data including all combinations of listings of all intents and confidence scores for each of the first machine-learning logic model 172 and the second machine-learning logic model 174 so that based on the specific combination of such intents and confidence scores included in the feature vector 176, the ensemble model 178 processes the feature vector 176 to output a query response having a highest probability of being an accurate response to the natural language query input.

A technical advantage of using both the first machine-learning logic model 172 and the second machine-learning logic model 174 is to generate two independent query response predictions, which when processed with complete accuracy, will result in the same answer. However, due to unknown inputs as a result of natural language input formats, one of the first machine-learning logic model 172 and the second machine-learning logic model 174 may provide an output not matching the other. Thus, the ensemble model 178 is then able to determine which output from both of the first machine-learning logic model 172 and the second machine-learning logic model 174 has a highest probability of being an accurate response to the natural language input due to the large and complete amount of data included in the feature vector. Since the ensemble model 178 is trained using training data including a combination of all output/confidence score pairs from the first machine-learning logic model 172 and the second machine-learning logic model 174, this enables the ensemble model 178 to select the output being most accurate for a response due to the high level of granular training data.

The ensemble model 178 performs similar to an error correction module in instances in which, for example, one of the first machine-learning logic model 172 and the second machine-learning logic model 174 has a higher tendency to predict an incorrect query response (such as, in a context of a "delivery issue" vs. a "damage item issue"). By using training data for the ensemble model 178 that is a complete set of output/confidence score pairs for all trained intents of the first machine-learning logic model 172 and the second machine-learning logic model 174 with matching query responses per set of data, the ensemble model 178 has more information to improve accuracy of the prediction.

Thus, the intent models 166 has a first component (e.g., the first machine-learning logic model 172) that is specialized in handling customer cares queries in a limited and specific domain for the context of beauty and cosmetic industry, and a second component (e.g., second machine-learning logic model 174) that specializes in natural language-based search understanding more generally. The intent models 166 combine outputs of these disparate components into the feature vector 176, which is a transformed version of the customer care query 168 for input to a boosted-tree decision-making model (e.g., the ensemble model 178).

Following, the ensemble model 178 communicates the query response to the computing device (e.g., the client devices 102 and 104). For example, based on receiving the natural language-based query from a customer service platform, the ensemble model 178 communicates a determined intent action item and an associated subject to the computing device. In another example, based on receiving the natural language-based query from a search platform, the ensemble model 178 communicates a determined item of interest to a search engine and outputs search results from the search engine to the computing device.

Figure 6:
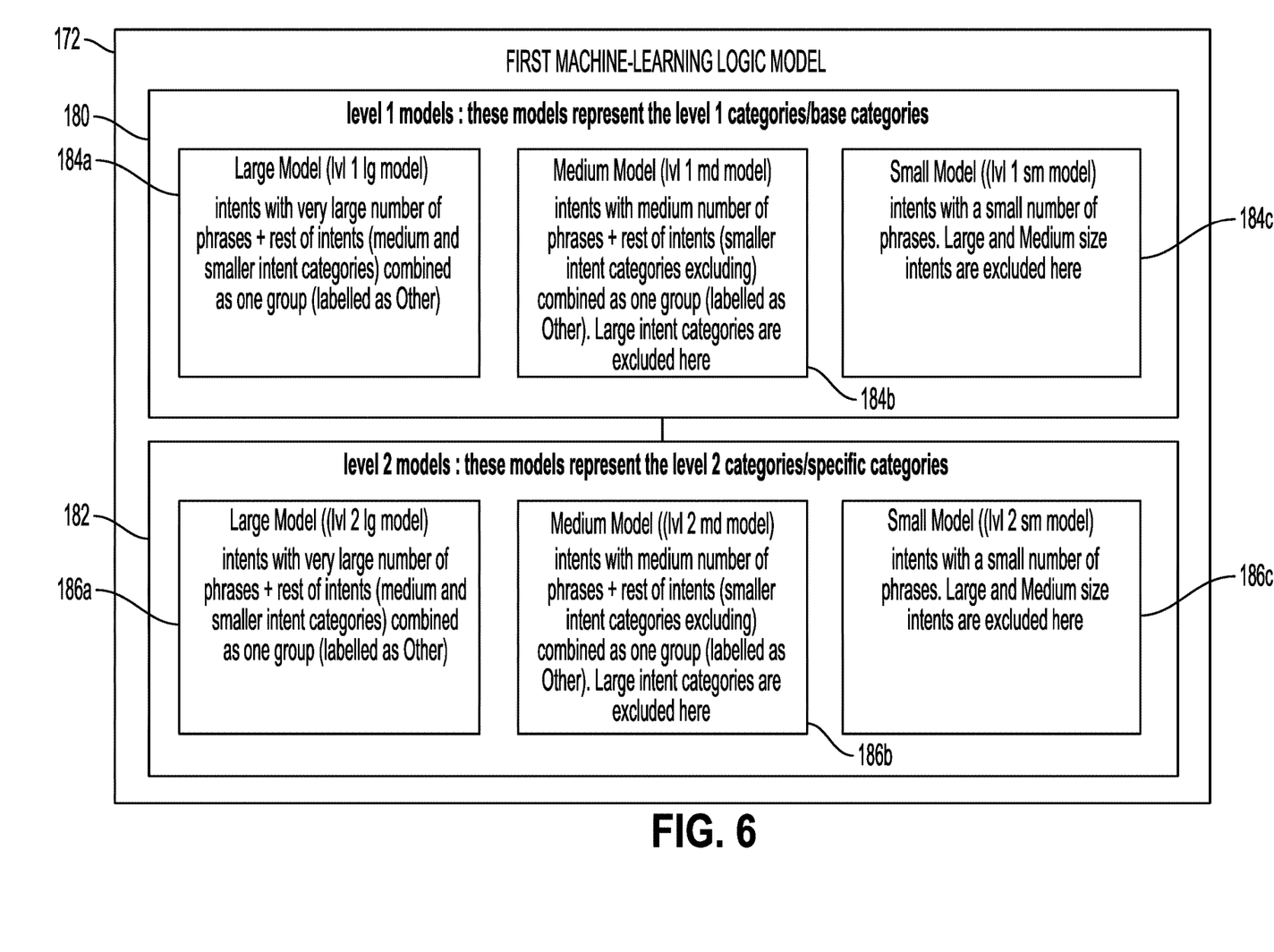
FIG. 6 is a block diagram conceptually illustrating components of the first machine-learning logic model, according to an example implementation.

FIG. 6 is a block diagram conceptually illustrating components of the first machine-learning logic model 172, according to an example implementation. As described above, the first machine-learning logic model 172 is trained using a multi-dimensional learned-embedding that includes semantically similar terms in proximity in an embedding space that is limited to salient terms associated with the beauty or cosmetic industry. To do so, the first machine-learning logic model 172 includes a first level model 180 and a second level model 182. The first level model 180 is trained using first level categories and the second level model 182 is trained using second level categories more narrow than the first level categories. The first level model 180 represents "base" level or genus level categories and the second level model 182 represents a species level within the genus. An example includes a base level category of "shipping issues" and a species level category of "delayed shipping". The first level model 180 is trained on base intents and the second level category is trained on specific intents. A purpose for dividing the first machine-learning logic model 172 into two levels is to reduce a misclassification rate of intents, and the first level model 180 has less intents to be trained on than the second level model 182.

Each of the first level model 180 and the second level model 182 are divided into multiple models including a large model 184a and 186a, a medium model 184b and 186b, and a small model 184c and 186c. Each of the multiple models are trained differently based on a size of a training data set. In some examples, an amount of training data per different possible queries is imbalanced, and some queries correlate to a low number of labeled training data. Thus, data bias can be mitigated by dividing training data according to a number of labeled examples per intent for training purposes, such as large having 1000 or more labeled examples, medium having 500-999 labeled examples, and small having 499 or less labeled examples. Data can be mined from email queries received at the guest services 114 of the networked computer system 100 and subsequently manually labeled by a guest services team member, for example.

Within examples described herein, the natural language-based query is first converted into an embedding formatted query having a vector format, and then the embedding formatted query is input into the computing platform 142 for processing. Learned embeddings compared to manual feature/information representation provides a multitude of benefits. Learned embeddings allow for compression of features, which is useful as representation of the natural language requires a feature set that spans the English language. The compression-ability of the embedding provides the ability to filter only the salient terms associated with the beauty space and allows a determination of detail as needed by adjusting the embedding dimensions.

Embedding formatted queries provide an ability to filter only the salient terms associated with the beauty space and provides context and relationships among the natural language queries.

Figure 7:
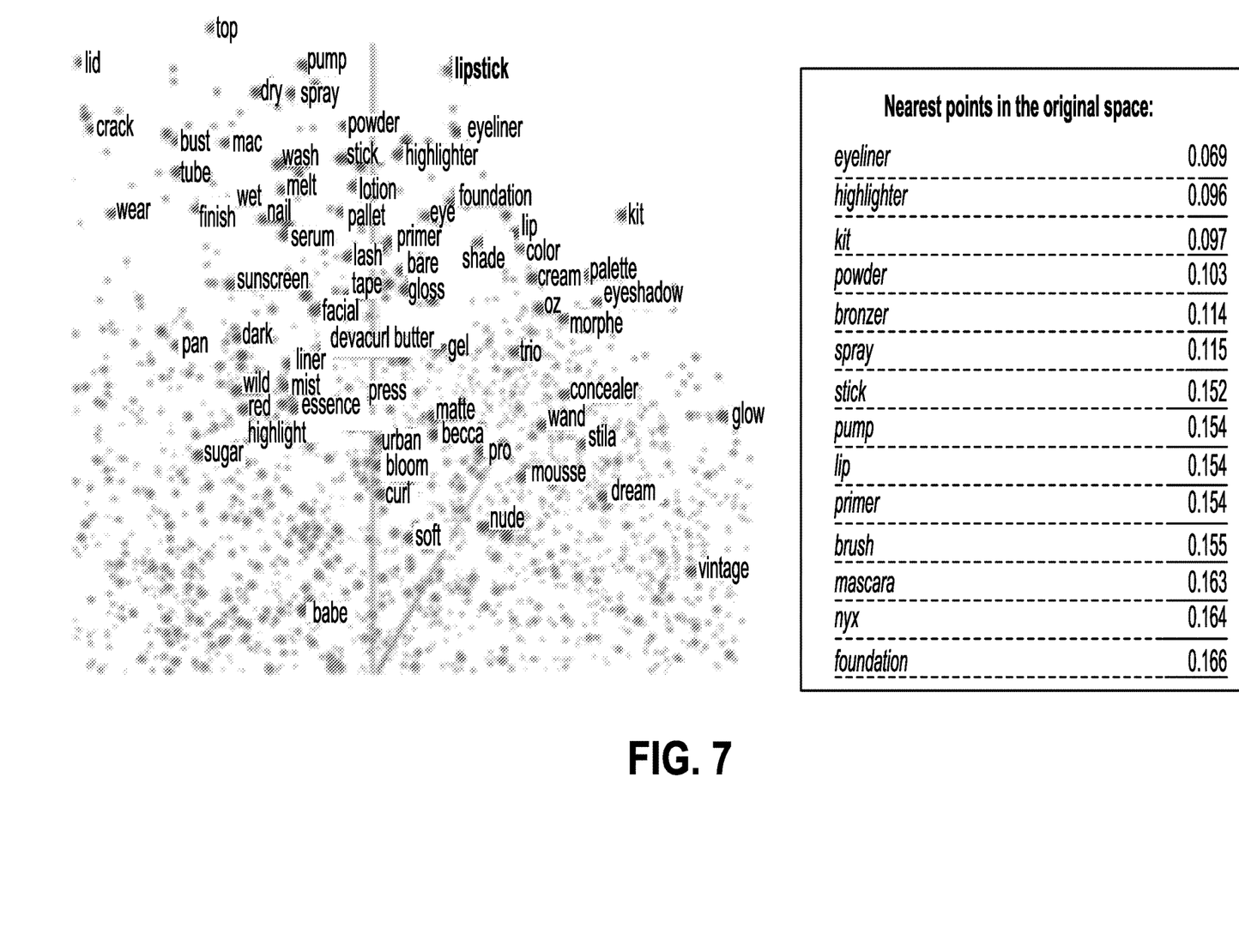
FIG. 7 is a conceptual illustration of embeddings in a three-dimensional space, according to an example implementation.

FIG. 7 is a conceptual illustration of embeddings in a three-dimensional space, according to an example implementation. Word embedding is a word representation type that allows machine learning algorithms to process words with similar meanings. More specifically, word embedding is a language modeling and feature learning technique to map words into vectors of real numbers using neural networks. One algorithm, known as Word2vec, represents words in vector space representation. For example, words are represented in a form of vectors and placement is performed in such a way that similar meaning words appear together and dissimilar words are located further apart. This arrangement allows the machine learning model to understand context and relationships between the words.

As an example, given a vocabulary of words V, and a sentence S, the machine-learning logic model processes each word $W_i$ of the sentence S, and predicts a next word ($W_{i+1}$) or a surrounding word of a sentence. During this prediction, a score is assigned to almost every word in the vocabulary with regard to sentence S. This process is repeated for the whole training data, which results in the creation of an embedding space. The score is a confidence score, for example, relating to a probability of responsiveness of the word to other surrounding words.

Embeddings are thus a translation step of converting the input queries into machine readable format. In FIG. 7, the embedding space is shown for beauty or cosmetic industry, and for an example input query of "I like red lipstick but I do not like eyeliner," the embeddings will focus on salient terms such as red, lipstick, and eyeliner. Since the term red tends to appear closer to lipstick than eyeliner in the dataset, the embeddings will highlight that relationship during the training process.

In an example operation, referring to the computing platform 142 of FIG. 4, initially a query is received such as "I'm looking for lipstick that works for dry skin". Next, the feature extractor 162 processes the query to extract features and also convert the query into the embedding form. The feature extractor 162 initially performs pre-processing to reduce ambiguity and remove unnecessary words and complexity from the query. For example, the feature extractor 162 performs pre-processing of the natural language-based query to remove non-descriptive words from the natural language-based query prior to converting the natural language-based query into the embedding formatted query. The non-descriptive words are identified, for example, based on a comparison to prior identified and labeled intents such that unidentified words not associated with the labeled intents are removed. Using the example above, pre-processing reduces the query to the following: "I look for lipstick work for dry skin".

The feature extractor 162 then converts the natural language-based query into the embedding formatted query having the vector format by mapping words of the natural language-based query into the vector format for a series of numbers such that similar meaning words are located together and dissimilar words are located further apart. The embedding formatted query thus includes an array of numbers representing a vector format of the input sentence of the query. In an example, the pre-processed query of "I look for lipstick work for dry skin" is converted to the embedding formatted query of (0.34564, 0.456465, 0.54645, 0.1234, 0.3132, . . . ). The numbers of the array represent words of the sentence with words having similar meaning given a similar number representation.

FIG. 7 conceptually illustrates an example of a three-dimensional embedding space of salient terms in the beauty industry, where number representations in an embedding format represent nearest points in space to a word of interest (e.g., lipstick). Words with similar meaning (as determined from context or usage) are represented with smaller numbers to indicate closeness (e.g., conceptually, close in distance) within the embedding space. Thus, in this example, FIG. 7 illustrates eyeliner, highlighter, kit, etc. are close in meaning and usage to "lipstick" whereas mascara and foundation are farther in meaning and usage.

Referring back to FIG. 4, the feature extractor 162 outputs the embedding format 164 of the query to the intent models 166 to process query, as described with respect to FIG. 5. The query response 170 is output, such as when the query is received from a customer service division, the query response 170 includes information for an "intent" and an associated entity (e.g., intent may be "delivery", and entity may be "shampoo") or when the query is received at a search input, the query response 170 includes information for "items" of interest within the search that can be delivered to a search engine to provide results.

Figure 8:
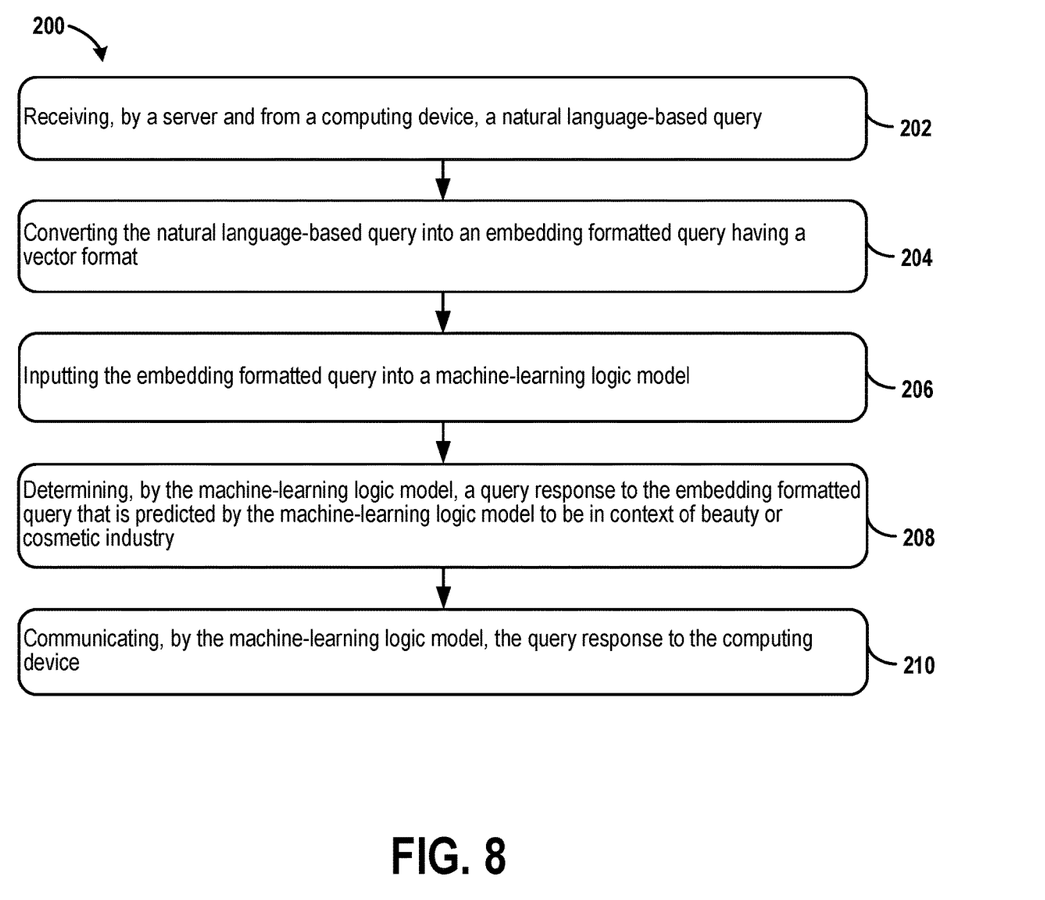
FIG. 8 is a flowchart illustrating an example of a computer-implemented method of providing a computing platform in a domain of beauty or cosmetic industry, according to an example implementation.

FIG. 8 is a flowchart illustrating an example of a computer-implemented method 200 of providing a computing platform in a domain of beauty or cosmetic industry, according to an example implementation. Method 200 shown in FIG. 8 presents an example of a method that could be used with or provided by the networked computer system 100, the client devices 102 and 104, and/or the host server device(s) 106 shown in FIG. 1 or with the computing platform 142 shown in FIG. 4, for example. Method 200 also presents an example of some functions to be performed by the intent models 166, for example.

Within examples, devices or systems described herein are used or configured to perform logical functions presented in FIG. 8. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 200 includes one or more operations, functions, or actions as illustrated by one or more of blocks 202-210. Although the blocks are illustrated in a sequential order, these blocks may also be performed in parallel, and/or in a different order than those described herein. In addition, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). The computer readable medium additionally or alternatively includes non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes receiving, by a server and from a computing device, a natural language-based query. In one example, the server is the host server device 106 and the computing device is the client device 102 shown in FIG. 1.

At block 204, the method 200 includes converting the natural language-based query into an embedding formatted query having a vector format. The host server device 106 implements functions of the computing platform 142 to convert the natural language-based query into an embedding formatted query having a vector format. In one example, converting the natural language-based query into the embedding formatted query having the vector format includes mapping words of the natural language-based query into the vector format comprising a series of numbers such that similar meaning words are located together and dissimilar words are located further apart.

In one example, the method 200 optionally includes pre-processing the natural language-based query to remove non-descriptive words from the natural language-based query prior to converting the natural language-based query into the embedding formatted query.

At block 206, the method 200 includes inputting the embedding formatted query into a machine-learning logic model. In one example, the machine-learning logic model includes the intent models 166 shown in FIG. 5.

At block 208, the method 200 includes determining, by the machine-learning logic model, a query response to the embedding formatted query that is predicted by the machine-learning logic model to be in context of beauty or cosmetic industry. The machine-learning logic model is trained using a multi-dimensional learned-embedding that includes semantically similar terms in proximity in an embedding space, and the embedding space is limited to salient terms associated with the beauty or cosmetic industry.

In one example, functions of block 208 include determining, by a first machine-learning logic model, a first predicted intent to the embedding formatted query, and determining, by a second machine-learning logic model, a second predicted intent to the embedding formatted query and the second predicted intent is different than the first predicted intent. Next, the functions include combining the first predicted intent and the second predicted intent into a feature vector, and processing, by the machine-learning logic model, the feature vector to determine the query response. In one example, additional functions of block 208 include processing the feature vector using a gradient-boosted decision tree machine learning library.

In still other examples, the functions of block 208 includes determining, by the first machine-learning logic model, the first predicted intent to the embedding formatted query that is predicted by the first machine-learning logic model to be in context of beauty or cosmetic industry and the first machine-learning logic model is trained using data limited to salient terms associated with the beauty or cosmetic industry, and determining, by the second machine-learning logic model, the second predicted intent to the embedding formatted query comprises determining the second predicted intent using the second machine-learning logic model that is trained using data not limited to salient terms associated with the beauty or cosmetic industry. In some examples, the first machine-learning logic model includes a first level model and a second level model, and the method 200 further includes training the first level model in the first machine-learning logic model using first level categories, and training the second level model in the first machine-learning logic model using second level categories more narrow than the first level categories. Each of the first level model and the second level model are divided into multiple models, and each of the multiple models are trained differently based on a size of a training data set.

In some examples, when the machine-learning logic model includes a first and second machine-learning logic model, the method 200 includes determining, by the first machine-learning logic model, a first predicted intent vector to the embedding formatted query and the first predicted intent vector comprises first confidence scores for all possible intents for which the first machine-learning logic model has been trained in response to the embedding formatted query, and also determining, by the second machine-learning logic model, a second predicted intent vector to the embedding formatted query and the second predicted intent vector comprises second confidence scores for all possible intents for which the second machine-learning logic model has been trained in response to the embedding formatted query. In these examples, the method 200 includes combining the first predicted intent vector and the second predicted intent vector into the feature vector that comprises a listing of all possible intents for which the first machine-learning logic model and the second machine-learning logic model have been trained with associated confidence scores ranking the possible intents as the query response.

At block 210, the method 200 includes communicating, by the machine-learning logic model, the query response to the computing device. In one example, based on receiving the natural language-based query from a customer service platform, the computing platform 142 communicates a determined intent action item and an associated subject to the computing device. In another example, based on receiving the natural language-based query from a search platform, the computing platform 142 communicates a determined item of interest to a search engine and the method 200 includes outputting search results from the search engine to the computing device.

Examples above describe implementations as methods performed by devices. In other examples, implementations take the form of a non-transitory computer-readable media having stored therein instructions, which when executed by a computing device having one or more processors causes the computing device to perform functions of the described methods.

Moreover, while some examples have been described in the context of fully functioning computers and computer systems, those skilled in the art will appreciate that various examples are capable of being distributed as a program product in a variety of forms, and that the disclosure applies equally regardless of a particular type of machine or computer-readable media used to effect the distribution. Thus, in further examples, implementations take the form of a system comprising a computing device comprising one or more processors and non-transitory computer-readable media having stored therein instructions, which when executed by the one or more processors, causes the computing device to perform functions of the described methods.

Further examples of machine-readable storage media, machine-readable media, or computer-readable (storage) media include, but are not limited to, recordable type media such as volatile and non-volatile memory devices, floppy and other removable drives, hard drives, thumb drives, optical disks (e.g., Compact Disk Read-Only Memory (CD ROM), Digital Versatile Disks, (DVDs), etc.), among others, and transmission type media such as digital and analog communication links.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to explain the principles of the examples, the practical application, and to enable others of ordinary skill in the art to understand the disclosure for various examples with various modifications as are suited to the particular use contemplated.

Having described the subject matter of the present disclosure in detail and by reference to specific examples thereof, it is noted that the various details disclosed herein should not be taken to imply that these details relate to elements that are essential components of the various examples described herein, even in cases where a particular element is illustrated in each of the drawings that accompany the present description. Further, it will be apparent that modifications and variations are possible without departing from the scope of the present disclosure, including, but not limited to, examples defined in the appended claims. More specifically, although some aspects of the present disclosure are identified herein as preferred or particularly advantageous, it is contemplated that the present disclosure is not necessarily limited to these aspects.

For the purposes of describing and defining examples herein, it is noted that terms "substantially" or "about" are utilized herein to represent an inherent degree of uncertainty attributed to any quantitative comparison, value, measurement, or other representation. The terms "substantially" and "about," when utilized herein, represent the degree by which a quantitative representation may vary from a stated reference without resulting in a change in a basic function of the subject matter at issue.

What is claimed is:

1. A method of providing a computing platform in a domain of beauty or cosmetic industry, comprising:
   receiving, by a server and from a computing device, a natural language-based query;
   converting the natural language-based query into an embedding formatted query having a vector format;
   inputting the embedding formatted query into a machine-learning logic model;
   determining, by the machine-learning logic model, a query response to the embedding formatted query that is predicted by the machine-learning logic model to be in context of beauty or cosmetic industry, wherein the machine-learning logic model is trained using a multi-dimensional learned-embedding that includes semantically similar terms in proximity in an embedding space, wherein the embedding space is limited to salient terms associated with the beauty or cosmetic industry, wherein determining, by the machine-learning logic model, the query response to the embedding formatted query comprises:
      determining, by a first machine-learning logic model, a first predicted intent to the embedding formatted query, wherein the first predicted intent is predicted by the first machine-learning logic model to be in context of beauty or cosmetic industry, wherein the first machine-learning logic model is trained using data limited to salient terms associated with the beauty or cosmetic industry;
      determining, by a second machine-learning logic model, a second predicted intent to the embedding formatted query, wherein the second predicted intent is different than the first predicted intent, wherein the second predicted intent is predicted using the second machine-learning logic model that is trained using data not limited to salient terms associated with the beauty or cosmetic industry;
      combining the first predicted intent and the second predicted intent into a feature vector; and
   processing, by the machine-learning logic model, the feature vector to determine the query response; and
   communicating, by the machine-learning logic model, the query response to the computing device.

2. The method of claim 1, wherein communicating, by the machine-learning logic model, the query response to the computing device comprises:
   based on receiving the natural language-based query from a customer service platform, communicating a determined intent action item and an associated subject to the computing device.

3. The method of claim 1, wherein communicating, by the machine-learning logic model, the query response to the computing device comprises:
   based on receiving the natural language-based query from a search platform, communicating a determined item of interest to a search engine; and
   outputting search results from the search engine to the computing device.

4. The method of claim 1, wherein converting the natural language-based query into the embedding formatted query having the vector format comprises:
   mapping words of the natural language-based query into the vector format comprising a series of numbers such that similar meaning words are located together and dissimilar words are located further apart.

5. The method of claim 1, further comprising:
   pre-processing the natural language-based query to remove non-descriptive words from the natural language-based query prior to converting the natural language-based query into the embedding formatted query.

6. The method of claim 1, wherein processing, by the machine-learning logic model, the feature vector to determine the query response comprises:
   processing the feature vector using a gradient-boosted decision tree machine learning library.

7. The method of claim 1, wherein the first machine-learning logic model includes a first level model and a second level model, and the method further comprises:
   training the first level model in the first machine-learning logic model using first level categories; and
   training the second level model in the first machine-learning logic model using second level categories more narrow than the first level categories.

8. The method of claim 7, wherein each of the first level model and the second level model are divided into multiple models, and each of the multiple models are trained differently based on a size of a training data set.

9. The method of claim 1, wherein:
   determining, by the first machine-learning logic model, the first predicted intent to the embedding formatted query comprises determining a first predicted intent vector to the embedding formatted query, wherein the first predicted intent vector comprises first confidence scores for all possible intents for which the first machine-learning logic model has been trained in response to the embedding formatted query; and determining, by the second machine-learning logic model, the second predicted intent to the embedding formatted query comprises determining a second predicted intent vector to the embedding formatted query, wherein the second predicted intent vector comprises second confidence scores for all possible intents for which the second machine-learning logic model has been trained in response to the embedding formatted query.

10. The method of claim 9, wherein combining the first predicted intent and the second predicted intent into the feature vector comprises:

combining the first predicted intent vector and the second predicted intent vector into the feature vector that comprises a listing of all possible intents for which the first machine-learning logic model and the second machine-learning logic model have been trained with associated confidence scores ranking the possible intents as the query response.

11. A system comprising:

one or more processors and non-transitory computer-readable media having stored therein instructions, which when executed by the one or more processors, causes the system to perform functions comprising:

receiving, from a computing device, a natural language-based query;

converting the natural language-based query into an embedding formatted query having a vector format;

inputting the embedding formatted query into a machine-learning logic model;

determining, by the machine-learning logic model, a query response to the embedding formatted query that is predicted by the machine-learning logic model to be in context of beauty or cosmetic industry, wherein the machine-learning logic model is trained using a multi-dimensional learned-embedding that includes semantically similar terms in proximity in an embedding space, wherein the embedding space is limited to salient terms associated with the beauty or cosmetic industry, wherein determining, by the machine-learning logic model, the query response to the embedding formatted query comprises:

determining, by a first machine-learning logic model, a first predicted intent to the embedding formatted query, wherein the first predicted intent is predicted by the first machine-learning logic model to be in context of beauty or cosmetic industry, wherein the first machine-learning logic model is trained using data limited to salient terms associated with the beauty or cosmetic industry;

determining, by a second machine-learning logic model, a second predicted intent to the embedding formatted query, wherein the second predicted intent is different than the first predicted intent, wherein the second predicted intent is predicted using the second machine-learning logic model that is trained using data not limited to salient terms associated with the beauty or cosmetic industry;

combining the first predicted intent and the second predicted intent into a feature vector; and processing, by the machine-learning logic model, the feature vector to determine the query response; and communicating, by the machine-learning logic model, the query response to the computing device.

12. The system of claim 11, wherein the first machine-learning logic model includes a first level model and a second level model, and the functions further comprise:

training the first level model in the first machine-learning logic model using first level categories; and training the second level model in the first machine-learning logic model using second level categories more narrow than the first level categories.

13. The system of claim 11, wherein:

determining, by the first machine-learning logic model, a first predicted intent vector to the embedding formatted query, wherein the first predicted intent vector comprises first confidence scores for all possible intents for which the first machine-learning logic model has been trained in response to the embedding formatted query; and determining, by the second machine-learning logic model, a second predicted intent vector to the embedding formatted query, wherein the second predicted intent vector comprises second confidence scores for all possible intents for which the second machine-learning logic model has been trained in response to the embedding formatted query.

14. The system of claim 13, wherein the functions further comprise:

combining the first predicted intent vector and the second predicted intent vector into a feature vector that comprises a listing of all possible intents for which the first machine-learning logic model and the second machine-learning logic model have been trained with associated confidence scores ranking the possible intents as the query response; and processing, by the machine-learning logic model, the feature vector to determine the query response.

15. A non-transitory computer-readable media having stored therein executable instructions, which when executed by a system one or more processors causes the system to perform functions comprising:

receiving, from a computing device, a natural language-based query;

converting the natural language-based query into an embedding formatted query having a vector format;

inputting the embedding formatted query into a machine-learning logic model;

determining, by the machine-learning logic model, a query response to the embedding formatted query that is predicted by the machine-learning logic model to be in context of beauty or cosmetic industry, wherein the machine-learning logic model is trained using a multi-dimensional learned-embedding that includes semantically similar terms in proximity in an embedding space, wherein the embedding space is limited to salient terms associated with the beauty or cosmetic industry, wherein determining, by the machine-learning logic model, the query response to the embedding formatted query comprises:

determining, by a first machine-learning logic model, a first predicted intent to the embedding formatted query, wherein the first predicted intent is predicted by the first machine-learning logic model to be in context of beauty or cosmetic industry, wherein the first machine-learning logic model is trained using data limited to salient terms associated with the beauty or cosmetic industry;

determining, by a second machine-learning logic model, a second predicted intent to the embedding formatted query, wherein the second predicted intent is different than the first predicted intent, wherein the second predicted intent is predicted using the second machine-learning logic model that is trained using data not limited to salient terms associated with the beauty or cosmetic industry;

combining the first predicted intent and the second predicted intent into a feature vector; and processing, by the machine-learning logic model, the feature vector to determine the query response; and communicating, by the machine-learning logic model, the query response to the computing device.

16. The non-transitory computer-readable media of claim 15, wherein:

determining, by the first machine-learning logic model, a first predicted intent vector to the embedding formatted query, wherein the first predicted intent vector comprises first confidence scores for all possible intents for which the first machine-learning logic model has been trained in response to the embedding formatted query; and determining, by the second machine-learning logic model, a second predicted intent vector to the embedding formatted query, wherein the second predicted intent vector comprises second confidence scores for all possible intents for which the second machine-learning logic model has been trained in response to the embedding formatted query.

* * * * *